(12) United States Patent
Garcia-Martin et al.

(10) Patent No.: US 7,894,593 B2
(45) Date of Patent: Feb. 22, 2011

(54) CALLBACK SERVICES IN A COMMUNICATION SYSTEM

(75) Inventors: Miguel-Angel Garcia-Martin, Helsinki (FI); Hisham Khartabil, Helsinki (FI); Markus Isomäki, Espoo (FI)

(73) Assignee: Nokia Corporation, Espoo (FI)

( * ) Notice: Subject to any disclaimer, the term of this patent is extended or adjusted under 35 U.S.C. 154(b) by 1124 days.

(21) Appl. No.: 11/083,955

(22) Filed: Mar. 21, 2005

(65) Prior Publication Data

US 2006/0077965 A1 Apr. 13, 2006

(30) Foreign Application Priority Data

Oct. 7, 2004 (GB) .................................. 0422275.8

(51) Int. Cl.
*H04M 7/00* (2006.01)

(52) U.S. Cl. .................................. 379/221.01; 379/230

(58) Field of Classification Search ............ 379/201.12, 379/88.17, 221.15; 370/248; 455/411
See application file for complete search history.

(56) References Cited

U.S. PATENT DOCUMENTS

| | | | | |
|---|---|---|---|---|
| 5,966,652 | A * | 10/1999 | Coad et al. ............... | 455/412.1 |
| 6,282,281 | B1 * | 8/2001 | Low ........................... | 379/230 |
| 6,798,771 | B1 * | 9/2004 | Low et al. .................... | 370/353 |
| 6,987,839 | B1 * | 1/2006 | Lockwood ............... | 379/88.12 |
| 7,477,734 | B1 * | 1/2009 | Smith ..................... | 379/220.01 |
| 2003/0040309 | A1 * | 2/2003 | Hughes et al. .............. | 455/426 |
| 2003/0152211 | A1 * | 8/2003 | Kruger et al. .......... | 379/221.02 |
| 2003/0179762 | A1 | 9/2003 | Isomaki et al. | |

FOREIGN PATENT DOCUMENTS

EP 1096768 5/2001

OTHER PUBLICATIONS

H. Schulzrinne et al., "The tel URI for Telephone Calls", Internet Engineering Task Force, Internet Draft, Feb. 19, 2003.
H. Schulzrinne, et al. (Columbia U.), "The tel URI for Telephone Calls", Feb. 19, 2003, pp. 1-19.
J. Peterson, "enumservice registration for Session Initiation Protocol (SIP) Addresses-ofRecord", RFC 3764, Apr. 2004.

(Continued)

*Primary Examiner*—Curtis Kuntz
*Assistant Examiner*—Mohammad Islam
(74) *Attorney, Agent, or Firm*—Mintz. Levin, Cohn, Ferris, Glovsky, and Popeo, P.C.

(57) ABSTRACT

A method provides callback services in a communications system to a first party from a second party. The method includes supplying the second party with a telephone number of the first party in a first format. The method also includes selecting a numbering plan out of plurality of numbering plans based on at least one of the country and network where the second party is located. The method also includes converting the telephone number from the first format to a second format using the selected numbering plan.

37 Claims, 10 Drawing Sheets

OTHER PUBLICATIONS

P. Falstrom et al., The E.164 to Uniform Resource Identifiers (URI) Dynamic Delegation Discovery System (DDS) Application (ENUM), Apr. 2004.

P. Falstrom, "E.164 No. And DNS", RFC 2916, Sep. 2000.

A. Vaha-Sipila, "URLs for Telephone Calls", RFC 2806, Apr. 2000.

3GPP TS 24.229, V6.5.1, 3rd Generation Partnership Project; Technical Specification Group Core Network; IP Multimedia Call Control Protocol based on Session Initiation Protocol (SIP) and Session Description Protocol (SDP); Stage 3 (Release 6), Jan. 2005.

J. Rosenberg et al., "SIP: Session Initiation Protocol", RFC 3261, Jun. 2002.

\* cited by examiner

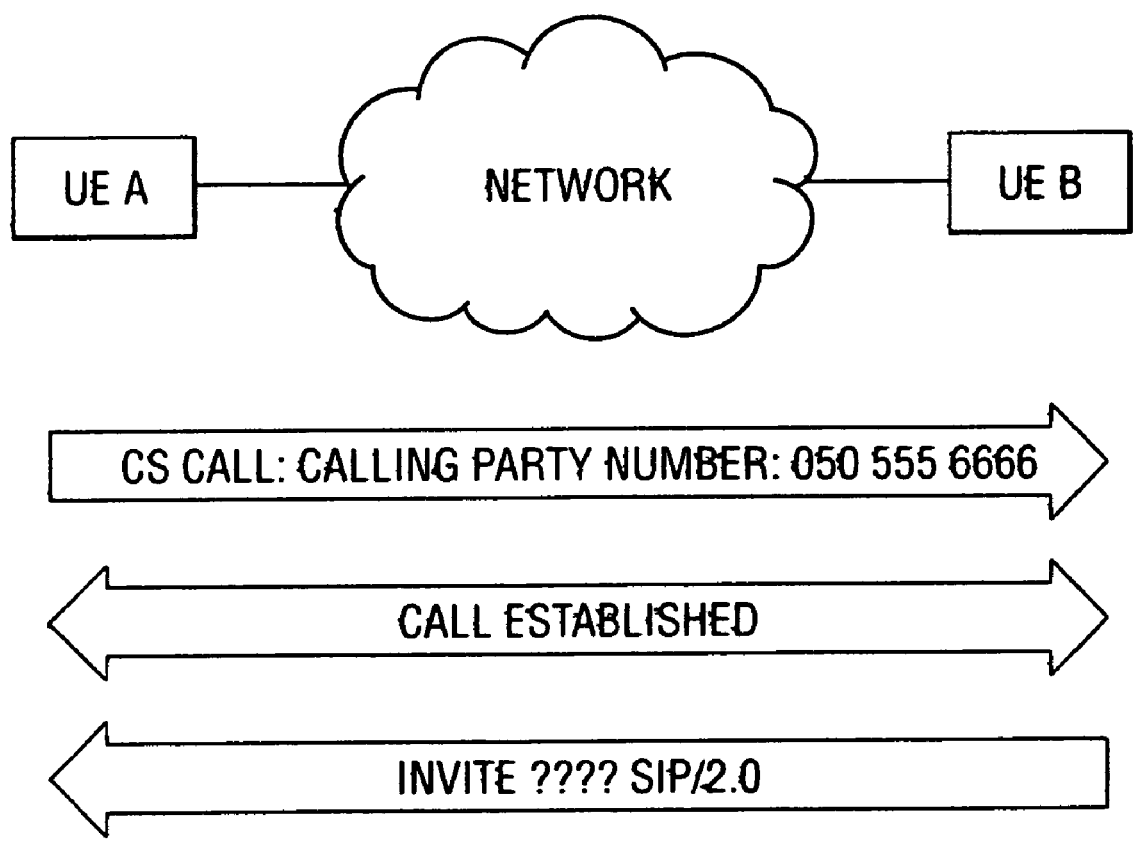

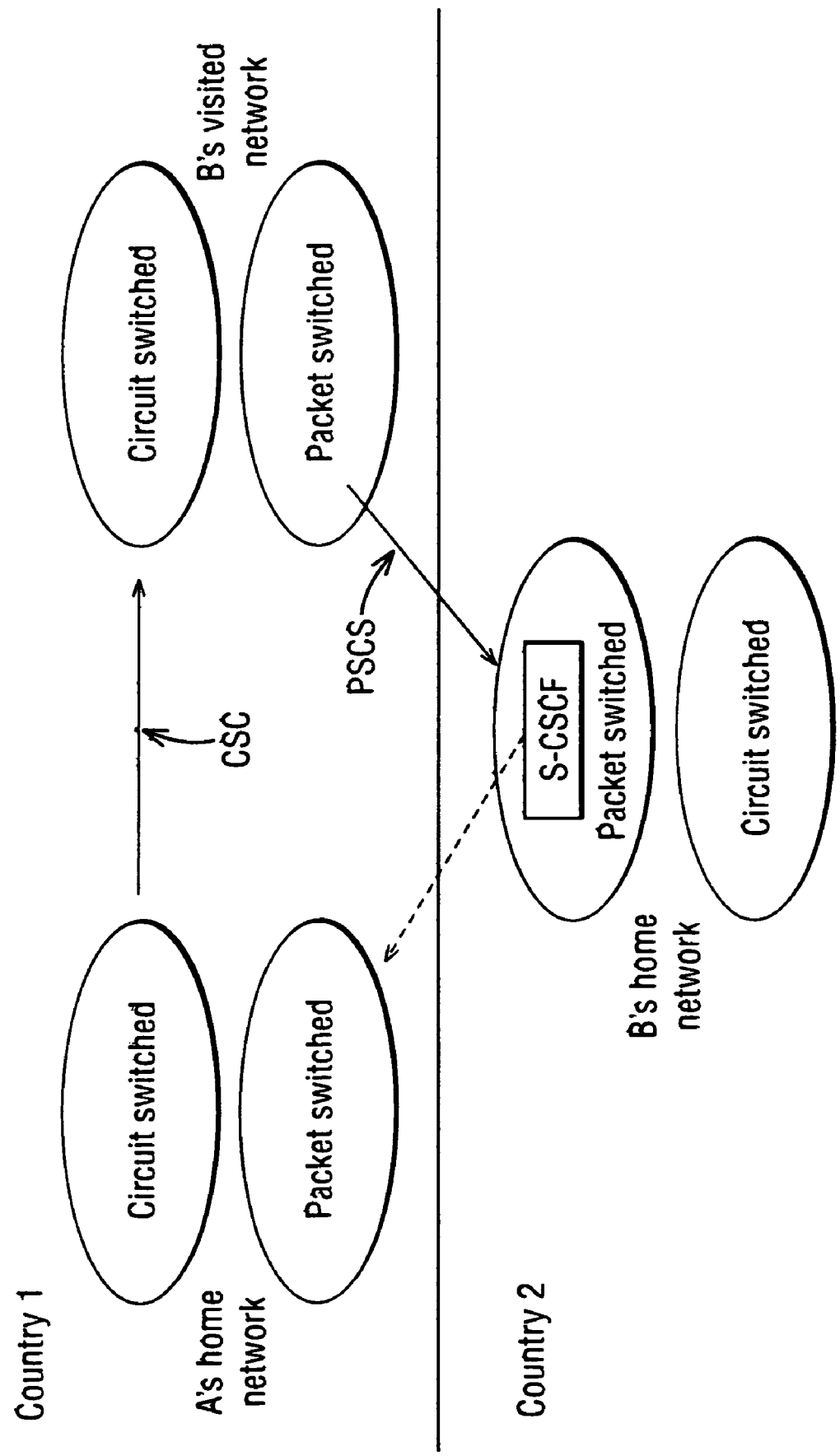

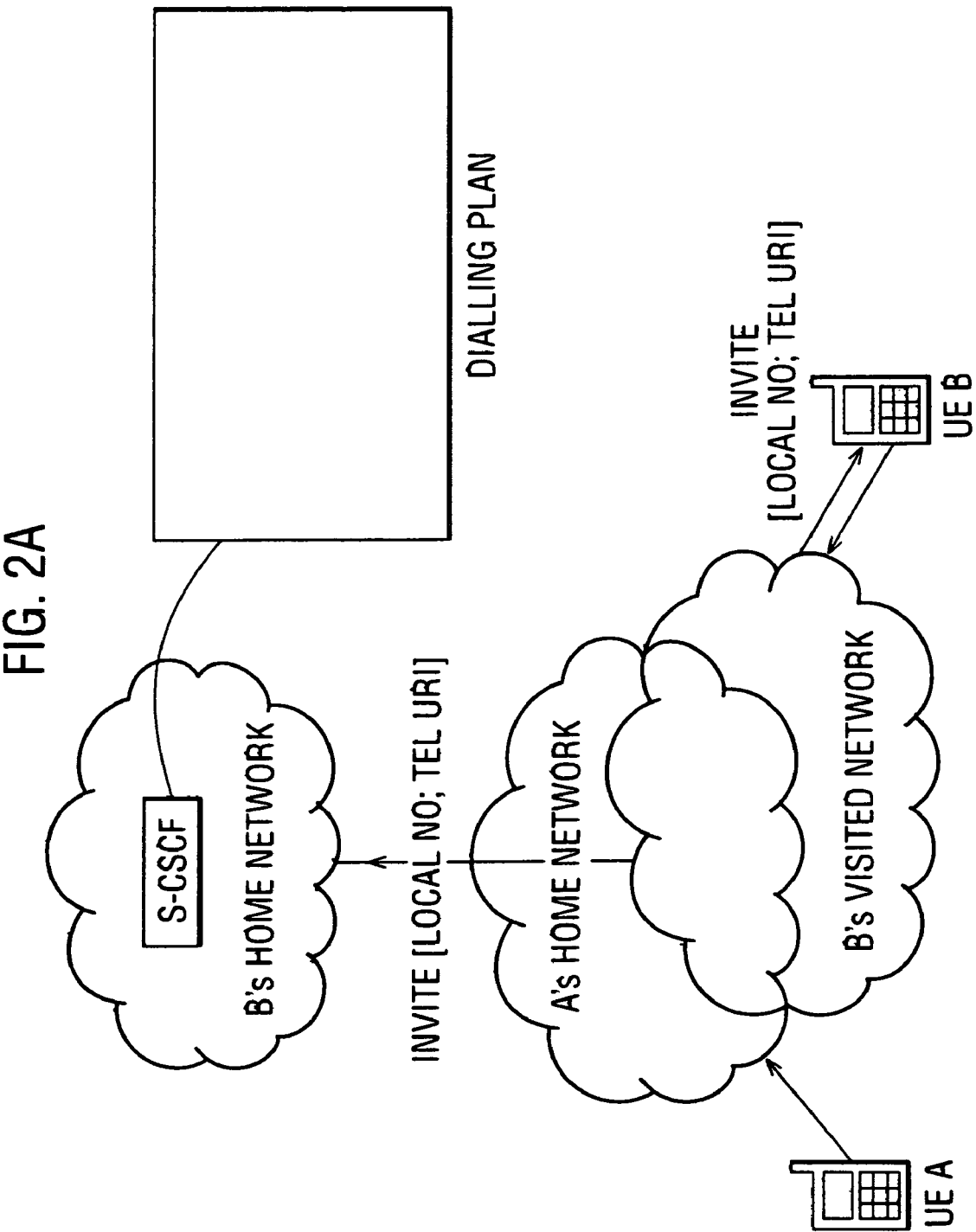

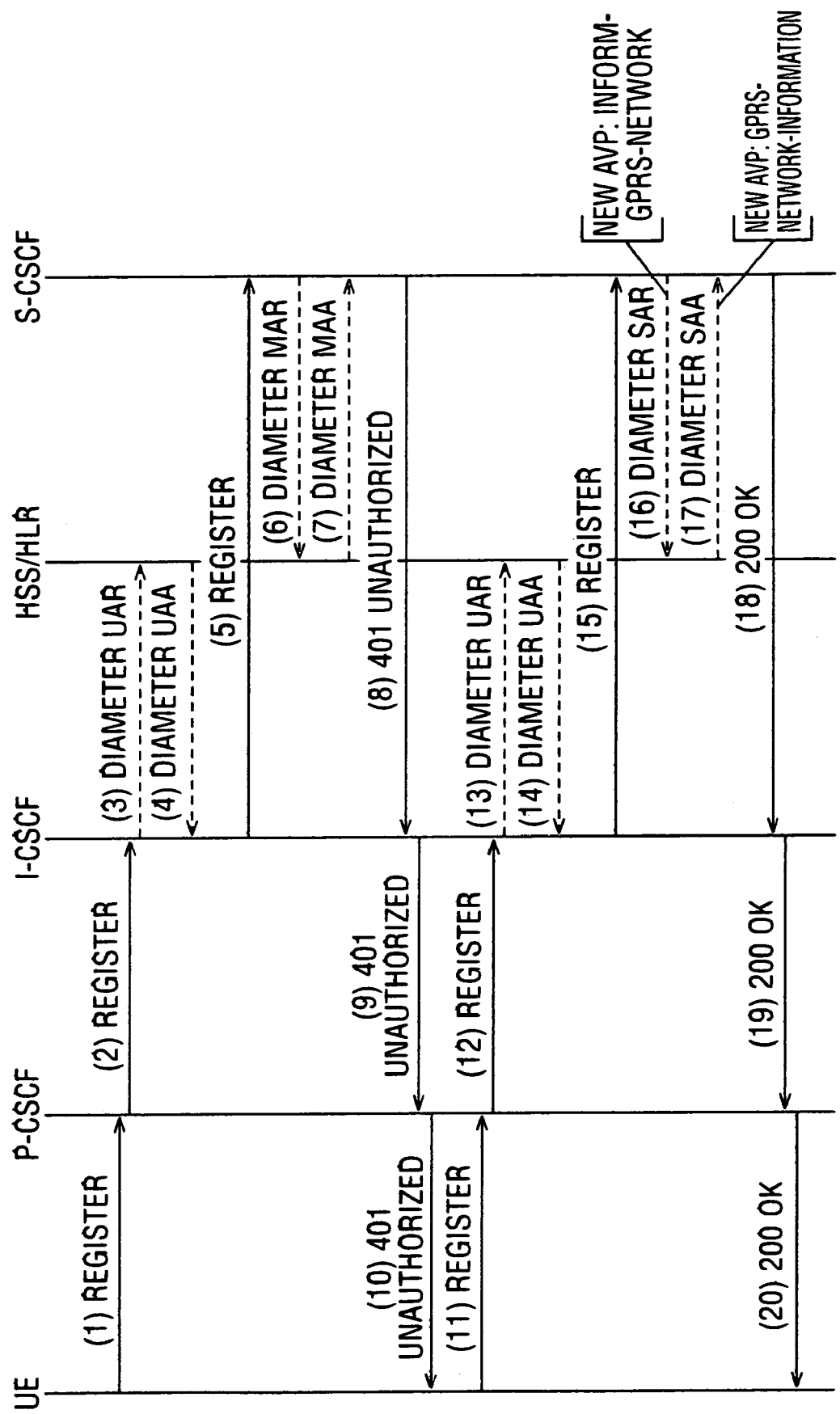

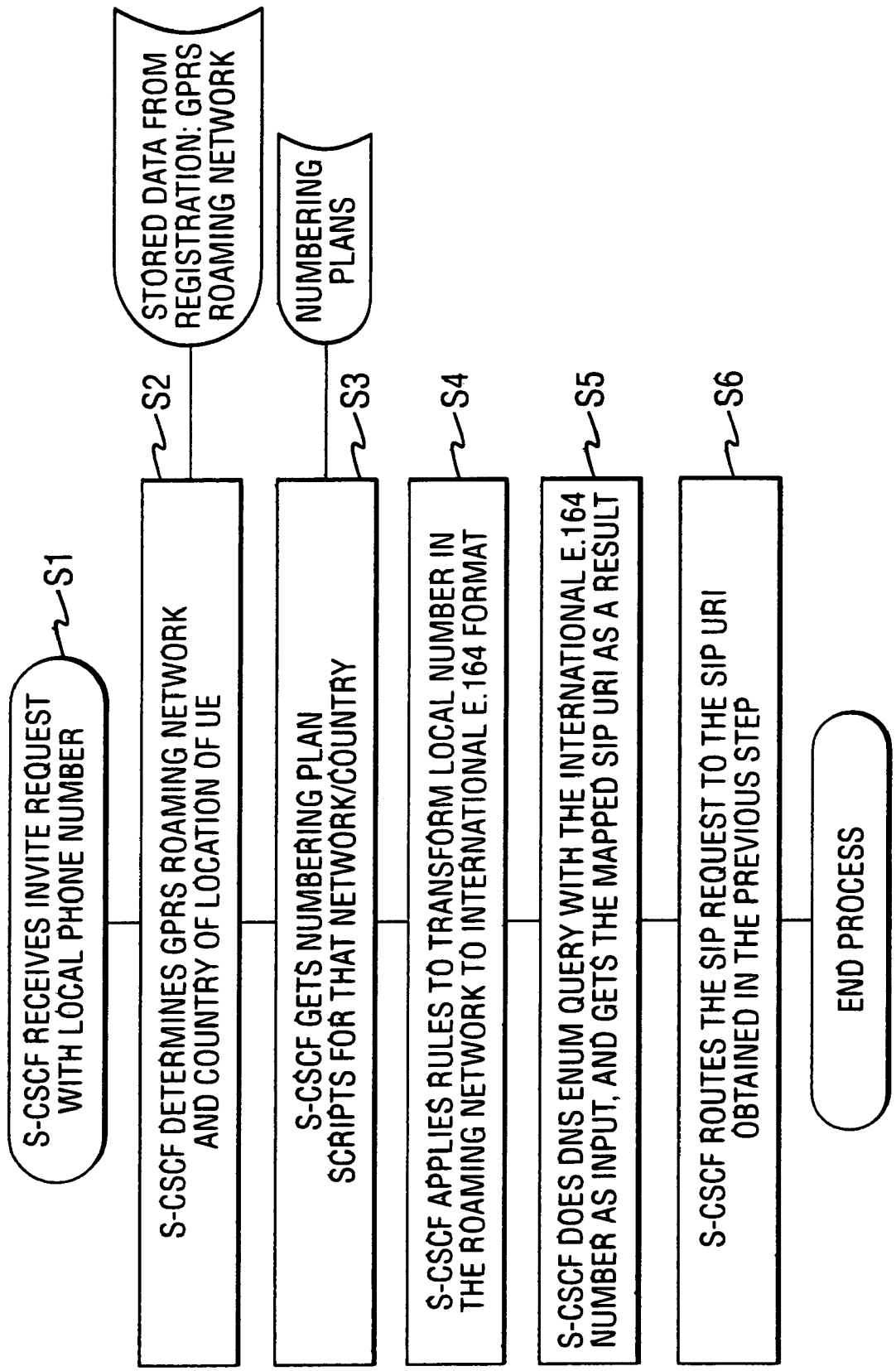

FIG. 5

SAR → | | DCA | SIP URI | INFORM-GPRS-N/W | 60

FIG. 6

SAA → | | DCA | SIP URI | GPRS-N/W-INFO | 62

FIG. 7

REQUEST_URI → | SIP | 050 555 6666 | EXAMPLE.COM | USER = PHONE |

CALLBACK SERVICES IN A COMMUNICATION SYSTEM

BACKGROUND OF THE INVENTION

1. Field of the Invention

The present invention relates to call back services in a communication system.

2. Description of the Related Art

A diverse range of communication systems are in use today enabling communication between two or more entities, such as user equipment and/or other nodes associated with the system. Such systems may comprise, for example, communication of voice, data, and multimedia data.

Communication systems providing wireless communication for user terminals or other nodes are known. An example of a wireless system is a public land mobile network (PLMN). A PLMN is typically a cellular network wherein a base transceiver station (BTS) or similar access entity serves user equipment (UE) such as mobile stations (MS) via a wireless interface. The operation of the apparatus required for the communication is usually controlled by one or more control entities, which themselves may be interconnected. One or more gateway nodes provide for connecting the PLMN to other networks. Examples of other such networks are another cellular network, a public switched telephone network (PSTN) and packet switched data networks such as an IP (Internet Protocol) based network. The communication between the user equipment and the other elements of the communication system are based on an appropriate communications protocol, which defines the "rules" under which communication is handled in the system.

In the current third generation (3G) wireless system, there are defined various servers for the handling of different communication services for mobile users. These include servers that provide call session control functions, known as CSCFs. Control functions may also be provided by entities such as a home subscriber server (HSS) and various application servers (AS). The HSS is typically for permanently storing the user's (subscriber's) profile. For example, in the Release 5 architecture for 3G, as specified by the $3^{rd}$ Generation Partnership Project (3GPP), these entities can be found located in the IP Multimedia Subsystem (IMS). Call session control functions provides a serving function S-CSCF, an interrogating function, I-CSCF and a proxy function P-CSCF.

IMS user terminals, although using the IMS network (that requires packet-switched connectivity, but not circuit-switched connectivity), usually also implement classical circuit-switched telephony terminals.

The IMS network may sit at the hub of the 3G architecture, supporting an IP based network that handles advanced multimedia services. The 3GPP has chosen Session Initiation Protocol (SIP) as a core session signalling protocol for 3G IP Multimedia Subsystem (IMS) networks. SIP has been developed by the Internet Engineering Task Force (IETF) in RFC 3261 and a number of other RFCs. The 3GPP specification 24.229 describes the IMS network basic operation from an SIP perspective. It should be noted that SIP is a request/response style protocol, in the sense that for every message sent from a source, there is one or more associated responses from the destination confirming receipt of the sent message.

Another protocol under discussion is the TEL Uniform Resource Identifier (URI). The TEL URI was originally specified in RFC 2806, http://www.ietf.org/rfc/rfc2806.txt and it is currently under revision. The TEL URI provides a mechanism to express a telephone number as a URI. Since SIP can carry URIs, the TEL URI can be applied to SIP, so that SIP can transport TEL URIs (telephone numbers). Unfortunately, TEL URIs do not provide SIP routing information, therefore, TEL URIs have to be translated at a some stage into routable SIP URIs.

The translation of TEL URIs into SIP URIs is typically done with an existing translation mechanism known as E.164 number translation (ENUM), which maps an international E.164 number into an SIP URI. ENUM was originally specified in RFC 2916, http://www.ietf.org/rfc/rfc2916.txt and has been recently revised in RFC 3761, http://www.ietf.org/rfc/rfc3761.txt and RFC 3764, http://www.ietf.org/rfc/rfc3764.txt. The mechanism uses the hierarchical Domain Name Server (DNS) system to supply a SIP URI associated to a TEL URI.

Existing wireless communications systems allow a user to roam between networks. According to existing phone number information protocols, there may be differences between the way in which a calling party's number is displayed to a called party, depending on whether the called party is in his home network or in a foreign (visited) network. That is, if a user is roaming to a country different to his home country, calls originated in that country may display the local national format of the calling party's number to the user, whereas calls originated in the user's home country will be displayed in international format to the user. An added complexity is that a national telephone number is valid in the context of a country where the user is roaming. It will be appreciated that each country can provide one or more networks, some or all of which may have roaming agreements with the home network.

FIG. 1A illustrates the problem. A first user equipment UE A represents the calling party and the second user equipment UE B represents the called party. The user equipment UE B is roaming in a visited network and the user equipment UE A is a subscriber of that said visited network or another network in the same country. Where the user of user equipment UE A is calling to user B, the number (calling party number) which is displayed at the user equipment UE B once the CS call is established is represented in national format. The calling party number: 050 555 6666 is illustrated in FIG. 1A.

It is expected that in the future the called party more often needs to establish a callback type of services to the original calling party, in particular for the establishment of services such as SIP/IMS sessions to enrich an existing voice call which has already been established, or to provide SIP/IMS sessions after the call has terminated. To establish a callback, the original called party UE B should issue an INVITE request, as shown in FIG. 1A, but in order for the network to route an SIP session from the user equipment UE B to the user equipment UE A, the network needs to know the SIP URI (Uniform Resource Identifier) of the user A.

An additional problem when circuit-switched calls are complemented with SIP/IMS sessions resides in the fact divergence of the call control in roaming scenarios between both CS calls and SIP/IMS sessions. CS calls follows the visited network control, i.e. an entity in the visited network (e.g. an MSC or MSC server) controls and provides the routing towards the recipient of the call, whereas IMS follows the home control model, where routing towards the recipient is provided by an entity in the home network (e.g. S-CSCF). This divergence originates a routing problem when telephone numbers obtained from the local circuit-switched network are extrapolated and used in the IMS.

The ENUM translation mechanism mentioned above requires as an input the telephone number in international E.164 format. It will be evident that in the situation where user B obtains a national telephone number from the user equipment UE A, the ENUM translation mechanism cannot be utilised when the call control of the user is in his home network, since the home network cannot utilise the national telephone number of some foreign network/country. This is represented by the query marks in the INVITE request in FIG. 1A

SUMMARY OF THE INVENTION

It is an aim of the present invention to provide a solution to this problem, so that call back services can always be established regardless of whether or not the user is in his home network or is roaming.

According to one aspect of the invention there is provided a method of providing call back services in a communications system to a first party from a second party, comprising: supplying the second party with a telephone number of the first party in a first format; selecting a numbering plan out of plurality of numbering plans based on at least one of the country and network where the second party is located; and converting the telephone number from the first format to a second format using the selected numbering plan.

A further aspect of the invention provides a method of providing call back services in a communications system to a first party from a second party, comprising: supplying the second party with a telephone number of the first party in a first format; transmitting from the second party a request including the telephone number of the first party in the first format; determining at least one of the country and network where the second party is located; and selecting a numbering plan from a serving controller based on the determined country/network and using the numbering plan to convert the telephone number of the first party from the first format to a second format.

A further aspect of the invention provides a method of providing call back services in a communication system to a first party from a second party, comprising: supplying the second party with a telephone number of the first party in a first format; downloading from a server to a user equipment of the second party a numbering plan based on at least one of the country and network where the second party is located; and using the numbering plan to convert the telephone number from the first format to a second format.

A still further aspect of the invention provides a communications system comprising: a first network including a serving controller, the serving controller holding at least one numbering plan to convert a telephone number from a first format to a second format; means for establishing a call between a first party and a second party, the second party being supplied with the telephone number of the first party in a first format; means for determining at least one of a country and network where the second party is located; means for selecting a numbering plan based on the determined country/network; and means for converting the telephone number from the first format to a second format using the selected numbering plan.

Another aspect of the invention provides a network entity for use in a communications system for providing communication between a first party and a second party, the network entity comprising: means for storing at least one numbering plan; means for receiving from a second party a request with a telephone number of the first party in a first format; means for determining at least one of a country and network where the second party is located; means for selecting a numbering plan based on the determined network/country; means for converting the telephone number of the first party from the first format to a second format.

It will be appreciated that generally the second party will be utilising a network in a country outside his home network, where the first format is a national format and the second format is an international format of the first party's telephone number.

Another aspect of the invention provides a user equipment for use in a communications system, the user equipment comprising: means for downloading from a server a numbering plan to convert a telephone number from a first format to a second format; means for receiving a telephone number of a calling party in a first format; and means for converting the telephone number from the first format to a second format.

Another aspect of the invention provides an application server for storing and delivering numbering plans in a communication network, the application server comprising; means for receiving a message in which message user equipment requests a numbering plan, the message further identifying at least one of a network and country where the user equipment is located; means for selecting a numbering plan based on the network and/or the country where the user equipment is located; and means for sending in a response message the selected numbering plan.

BRIEF DESCRIPTION OF THE DRAWINGS

For a better understanding of the present invention and to show how the same may be carried into effect, reference will now be made by way of example to the accompanying drawings in which:

FIGS. 1A and 1B are schematic diagrams illustrating the problem when a called party roams from his home network;

FIG. 2A is a schematic diagram illustrating a variant on the first embodiment of the invention;

FIG. 3 illustrates message exchange implementing an extension to the registration procedure in the first embodiment of the invention;

FIG. 4 is a flow chart illustrating the process flow for the INVITE process of the first embodiment of the invention;

FIG. 5 illustrates a Diameter SAR message;

FIG. 6 illustrates a Diameter SAA message;

FIG. 7 illustrates a request-URI;

DETAILED DESCRIPTION OF THE PREFERRED EMBODIMENTS

Certain embodiments of the present invention will be described in the following by way of example, with reference to the exemplifying architecture of a third generation (3G) mobile communications system. However, it shall be appreciated that the embodiments may be applied to any suitable mobile communication system.

Figure 1:
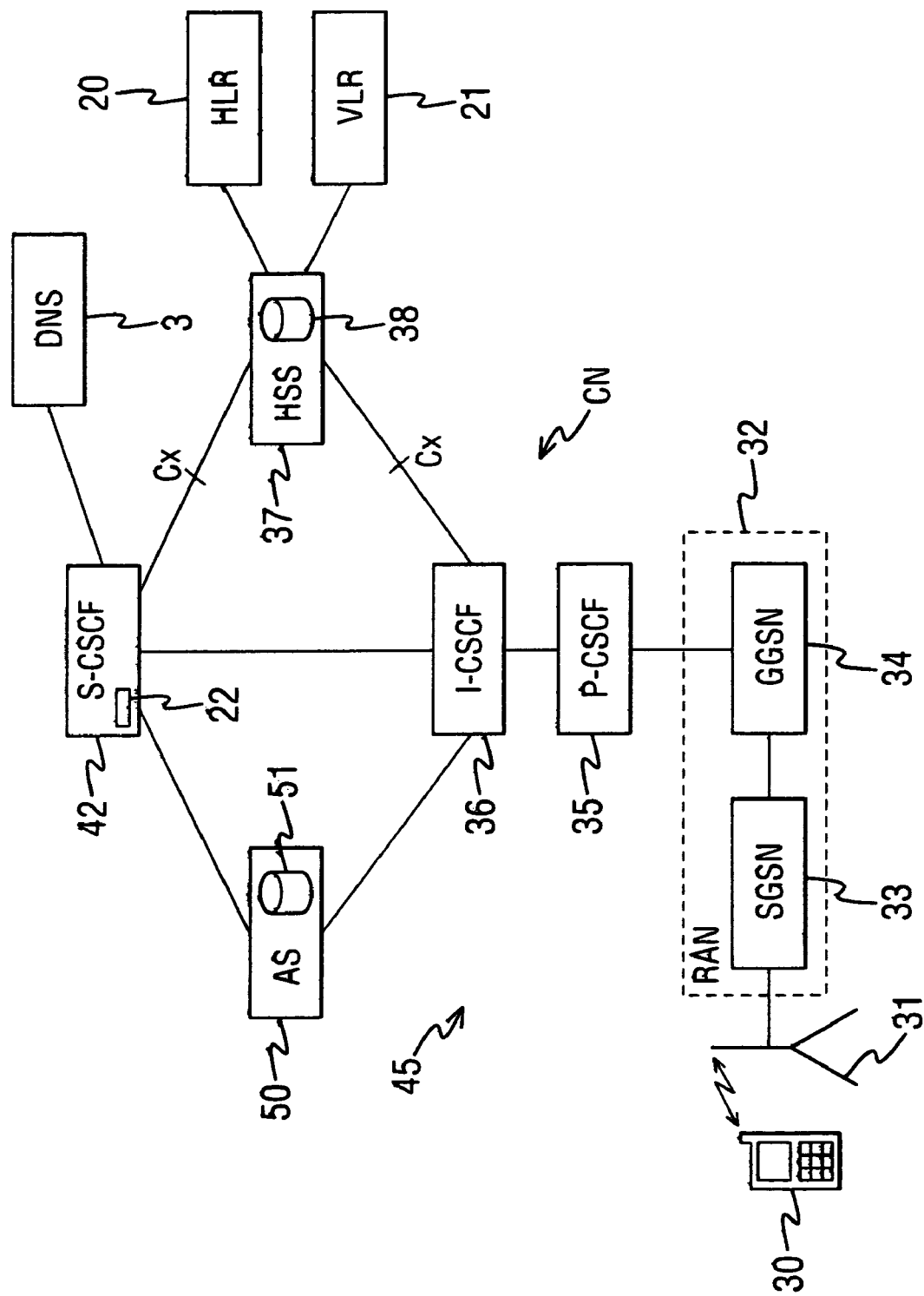
FIG. 1 is a schematic block diagram of a mobile communications network.

Reference is made to FIG. 1, which shows an example of a network architecture wherein the invention may be embodied. In FIG. 1 an IP Multimedia Subsystem (IMS) 45 is provided for offering IP multimedia services for IP Multimedia Network subscribers.

As described above, IP Multimedia (IM) functionalities can be provided by means of a mobile communication system. A mobile communication system is typically arranged to serve a plurality of mobile user equipment (UE) usually via a wireless interface between the user equipment and at least one base station of the communication system. The mobile communication system may logically be divided between a radio access network (RAN) and a core network (CN).

In the system a base station 31 is arranged to transmit signals to and receive signals from mobile user equipment 30 of a mobile user (i.e. subscriber) via a wireless interface between the user equipment and the radio access network. Correspondingly, the mobile user equipment is able to transmit signals to and receive signals from the radio access network via the wireless interface.

In the shown arrangement the user equipment 30 may access the IMS network 45 via the access network associated with base station 31, respectively. It shall be appreciated that, although, for clarity reasons FIG. 1 shows a base station of only one radio access network, a typical communication network system usually includes a number of radio access networks.

The 3G radio access network (RAN) is typically controlled by an appropriate radio network controller (RNC). This controller is not shown in order to enhance clarity. A controller may be assigned for each base station or a controller can control a plurality of base stations, for example in the radio access network level. It shall thus be appreciated that the name, location and number of the network controllers depends on the system.

The RAN is just one example of wireless access. Other accesses include, but are not limited to, Wireless LAN, CDMA 2000 access networks, etc.

The mobile user equipment 30 may comprise any appropriate mobile user equipment adapted for Internet Protocol (IP) communication to connect to the network. For example, the mobile user may access the cellular network by means of a Personal Computer (PC), Personal Data Assistant (PDA), Mobile Station (MS) and so on. The following examples are described in the context of mobile stations.

One skilled in the art is familiar with the features and operation of a typical mobile station. Thus, it is sufficient to note that the user may use a mobile station for tasks such as for making and receiving phone calls, for receiving and sending data from and to the network and for experiencing multimedia content or otherwise using multimedia services. A mobile station may include an antenna for wirelessly receiving and transmitting signals from and to base stations of the mobile communication network. A mobile station may also be provided with a display for displaying images and other graphical information for the user of the mobile user equipment. Camera means may be provided for capturing still or video images. Speaker means are also typically provided. The operation of a mobile station may be controlled by means of an appropriate user interface such as control buttons, voice commands and so on. Furthermore, a mobile station is provided with a processor entity and a memory means, referred to herein as a store 54 (see FIG. 8).

It shall be appreciated that although only one mobile station is shown in FIG. 1 for clarity, a number of mobile stations may be in simultaneous communication with base stations of a mobile communication system.

The core network (CN) entities typically include various switching and other control entities and gateways for enabling the communication via a number of radio access networks and also for interfacing a single communication system with one or more communication system such as with other cellular systems and/or fixed line communication systems. In the 3GPP systems the radio access network controller is typically connected to an appropriate core network entity or entities such as, but not limited to, a serving general packet radio service support node (SGSN) 33. The radio access network controller is in communication with the serving GPRS support node via an appropriate interface, for example on an Iu interface. Although not shown, the SGSN typically has access to a designated subscriber database configured for storing information associated with the subscription of the respective user equipment.

The serving GPRS support node, in turn, typically communicates with a gateway GPRS support node (GGSN) 34 via the GPRS backbone network 32. This interface is commonly a switched packet data interface.

FIG. 1 shows an application server (AS) 50. The user equipment 30 may connect, via the GPRS network, to the application server that is connected to one or more data networks such as, but not limited to, the exemplifying Internet Protocol (IP) network. It shall be appreciated that a great number of application servers may be connected to each data network.

FIG. 1 also illustrates a Domain Name Server 3 connected to the S-CSCF 42.

The communication systems have developed in the direction wherein services are provided for the user equipment by means of various functions of the data network that are handled by controller entities, such as servers. For example, in the current third generation (3G) IP Multimedia Subsystem (IMS) it is assumed that several different servers providing various control functions are used for the service provision control. These include functions such as the call session control functions (CSCFs). The call session functions may be divided into various categories such as a proxy call session control function (P-CSCF), interrogating call session control function (I-CSCF), and serving call session control function (S-CSCF). It shall be appreciated that similar functions may be referred to in different systems with different names.

A user who wishes to use services provided by an application server via the IMS system needs first to register with a serving controller, such as the serving call session control function (S-CSCF) 42. As shown in FIG. 1, communication between the S-CSCF 42 and the user equipment 30 may be routed via one proxy call session control function (P-CSCF) 35 and an interrogating call session control function I-CSCF 36. The proxy CSCF 35 is thus for proxying messages from the UE 30 to a serving call session control function 42. The S-CSCF 42 in FIG. 1, in turn, provides the control entity the user equipment 30 needs to be registered with. The registration is required to enable the user equipment to request a service from the communication system.

The system of FIG. 1 is further arranged such that a user who has been provided with required communication resources by the backbone network and is registered to the S-CSCF 42 has to initiate the use of services offered by the application server 50 by sending a request for the desired service to the S-CSCF 42 over the communication system.

A user information storage entity may also be provided for storing subscriber i.e. user related information. In the particular embodiment the storage entity is shown to be provided by means of a home subscriber server (HSS) 37. The home subscriber server (HSS) 37 can be queried by other function entities over the appropriate interfaces, e.g. during registration, session set-up procedures and later. The subscriber information may include information such as data required for registration (e.g., the address of the S-CSCF that is serving the user) and authentication purposes (e.g. identities and registration status of the subscriber) and so on.

The HSS is an evolution of the GSM Home Location Register (HLR). The HLR 20 and a Visitor Location Register (VLR) 21 are used in particular to allow a mobile station to roam between circuit-switched networks. Each user has a home network which holds subscriber profile information, etc. about the user. When a user moves to a different country, he needs to access a circuit-switched visited network in order to make and receive calls services. Additionally, when the user roams to a visited GPRS network, the user can get IP connectivity services, including but not limited to, IP multimedia subsystem (IMS) services.

It is important to bear in mind that there are three different networks involved: a circuit-switched network providing telephony calls; a packet-switched network (e.g. GPRS) providing IP connectivity; and an IMS network providing multimedia services (e.g. multimedia sessions, presence, instant messaging, multimedia conferences, push-to-talk, etc.). Access to an IMS network requires access to a packet-switched network (as a pre-requisite).

When the user switches on his/her mobile phone, the phone is first registered on the circuit switched side. When registering to the IMS, the user equipment sends a REGISTER message to the P-CSCF, the P-CSCF locates an I-CSCF of the home network of the user, which allocates a S-CSCF to the user. The S-CSCF authenticates the user and, assuming the authentication procedure is valid, records user information (such as the UE's IP address and the P-CSCF's address). The HSS/HLR authorises this registration. During the registration to the circuit switched side, the visitor location register also allocates a temporary phone number for use in that network. The visitor location register VLR 21 also advises the home location register HLR 20 of the home network to which circuit switched (CS) network the subscriber is currently attached. Thus, the home location register of the home network always holds information about the network in a foreign country to which the subscriber is currently connected. Then the phone attaches to the packet switched side (e.g. GPRS) through the visited SGSN (serving GPRS support node) and the GGSN (gateway GPRS support node). The HLR is also informed and authorises usage.

Each user in the IMS is identified by at least a SIP URI. Typically an IMS user is also allocated a telephone number, sometimes the IMS telephone number being the same allocated for the same user in CS networks (then it is known as MSISDN (Mobile Subscriber ISDN (Integrated Services Digital Network) number)). Each S-CSCF is identified by a SIP URI (Session Initiation Protocol Uniform Resource Identifier).

Each S-CSCF is also identified by its Diameter client address. The Diameter based protocol is intended to provide an authentication, authorisation and accounting (AAA) framework for applications such as network access or IP (Internet Protocol) mobility. The basic Diameter transaction involves attribute value pairs (AVPs), that is paired attributes (e.g. user ID, password) and values for those attributes (e.g. John Doe, Marigold) which can be used for authentication purposes. These AVPs constitute information elements in a Diameter message. In the context of the IMS the S-CSCF uses Diameter to interact with an HSS.

FIG. 1B is a schematic diagram illustrating the scenario which will be discussed in more detail in relation to embodiments of the invention. FIG. 1B illustrates a home network for user A in a first country, country 1 and a home network for user B in a second country, country 2. FIG. 1B also illustrates a visited network for user B which is in the same country as A's home network (of course, visited network for user B may also be A's home network). Users A and B both have terminals (which are not shown in FIG. 1B but are shown in later figures) which support both circuit switched and packet switched connections and are attached to both networks. The arrow labelled CSC represents a circuit switched call from user A to user B while user B is in the visited network. This is how user B obtains the phone number of user A, but the phone number may be in the national format of country 1 because users A and B are located in the same country.

The arrow labelled PSCS represents a packet switched call-back session which the user B wishes to establish back to user A, using A's phone number received in the previous call. The packet switched session may be for example two transmitter video streams. Since for a packet switched service, the call control is at B's home network and B is roaming in another country, the session establishment is first directed to the S-CSCF in B's home network. However, the S-CSCF in B's home network (in country 2) then has a national phone number of user A (in country 1) and cannot handle it. In the following there are described solutions to this difficulty.

Figure 2:
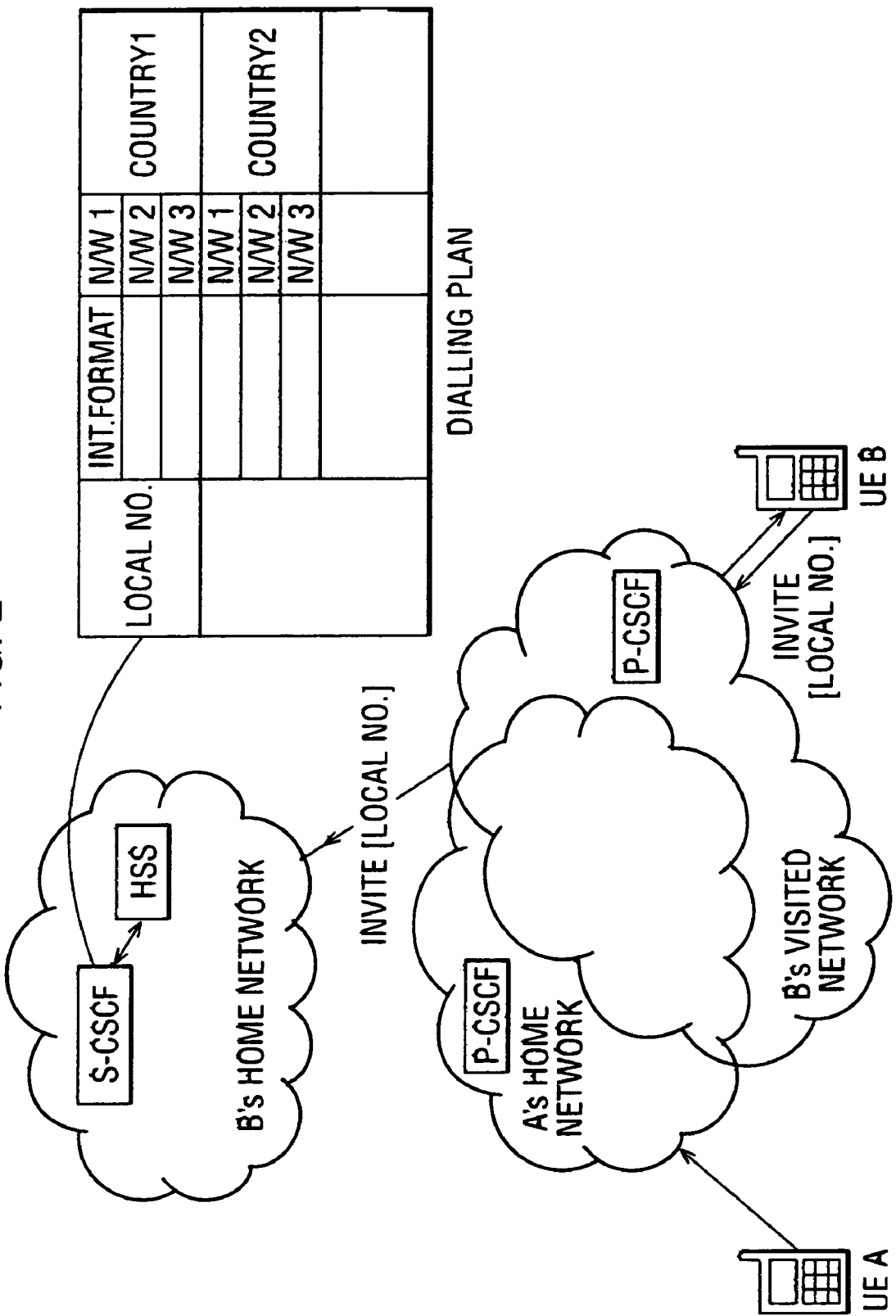
FIG. 2 is a schematic diagram illustrating one embodiment of the present invention.

FIG. 2 shows the scenario where a first user equipment UE A is connected to its own home network and a second user equipment, UE B is connected to B's visited network which is the same country as A's home network. However, the second user equipment UE B has a different home network (in a different country) which is labelled B's home network in FIG. 2. The home subscriber server HSS and S-CSCF of B's home network are shown, and the P-CSCF of B's visited network is shown. However, it will be appreciated that the networks also contain all of the functionality which has already been described with reference to FIG. 1.

A first embodiment of the invention will now be described. Take the scenario where the first user equipment UE A wishes to call the second user equipment UE B. Before this for telephoning circuit-switched (CS) services, the second user equipment UE B has to be registered in its visited network and accordingly the VLR of B's visited network has notified the HLR of B's home network of the identity of the visited network. For IMS services, B registers through the P-CSCF (home or visited) to the S-CSCF (home) and HSS (home). In the future it is expected that in order to enhance the call which is set up between UE A and UE B, the second user equipment UE B wishes to establish a session initiation protocol (SIP) session towards UE A, for example for sending a picture or a video stream. Alternatively, a SIP session may need to be established after the voice call has been finished. In order for the home and visited networks to route a SIP session from UE B to UE A, they need to know the SIP URI for UE A. In order to do this, when the second user equipment UE B registers to the IP multimedia sub-system IMS, the S-CSCF 42 of its home network queries the HSS of its home network to find out the CS visited network to which UE B is attached. The S-CSCF 42 implements a numbering plan for all countries for which the home network has roaming agreements with a network of that country. That is, the S-CSCF in B's home network now knows the existing differences between the representation of local and international numbers in all those countries. In this case, "local" means local to the visited network for UE B. Note that as part of the subscriber profile information held at the HSS 37, roaming agreements established between the home network and other networks are held for a particular subscriber.

It will be appreciated that because UE A is located in a network located within the same country of the network where UE B is roaming, when a call is established towards UE B, the number of UE A is supplied to UE B in national format (e.g. 050 555 6666) rather than international format (e.g. +358 50 555 6666), where +358 is the country code for Finland.

When the user equipment UE B wishes to establish a callback SIP session towards UE A, it dispatches a SIP INVITE request of which the destination (request-URI) is a SIP or TEL URI that contains A's telephone number in the format in which it has been provided to UE B, in this case local format. The S-CSCF 42 of B's home network receives the INVITE request including a national E.164 number of a foreign country, detects that UE B is not attached to a network of B's home country, identifies the CS network to which UE B is currently attached, and based on the numbering plan for that country which has been implemented changes the representation of A's telephone number from national to international.

The S-CSCF of B's home network then implements an E.164 number translation (ENUM) domain name server (DNS) query to the Domain Name System (DNS) 3 connected to S-CSCF, by implementing a DNS client which sends a DNS query containing an ENUM request to a DNS server. Since. DNS provides a hierarchical mechanism, although the request is launched to the DNS server 3 at B's home network or country, B's DNS server will contact or redirect to B's visited network or B's country. Eventually, A's DNS server 5 will provide the ENUM answer to the S-CSCF in B's home network which activates a known mechanism to find out the SIP URI mapped to A's telephone number. This means that the S-CSCF of B's home network now has the SIP URI of UE A and so can proceed with an SIP session in accordance with normal IMS procedures. It has to be noted that in this invention no modifications are proposed to standard ENUM and DNS procedures.

It is possible to implement a variant of the first embodiment where the user equipment itself, UE B, is able to determine the CS network and/or the country within which it is roaming from the CS attach procedure. This is shown in FIG. 2A. The user equipment UE B then creates an INVITE request with a TEL URI that indicates the name of the CS network and/or the country. This INVITE request is received by the S-CSCF 42 of B's home network as already described, which changes the representation of A's phone number from national to international based on the numbering plan which is implemented at the S-CSCF. The only difference in this variant of the first embodiment is that the S-CSCF does not need to get the name of the visited CS network from the HLR of B's home network.

A detailed implementation of the first embodiment will now be described with reference to FIGS. 3 to 7. FIG. 3 shows a partial registration flow of a user to the IP multimedia system. The user equipment UE B instigates a registration process via the P-CSCF and I-CSCF of its home network. The I-CSCF 36 dispatches a diameter user authentication request (UAR) to the HSS/HLR which returns a user authentication authorisation (UAA) message. Thus, the registration process can be completed for the user. Then, the S-CSCF 42 dispatches a diameter multimedia authentication request (MAR) to the HSS/HLR 37 which returns a diameter multimedia authentication authorisation (MAA) message to the S-CSCF 42. The Diameter MAA message contains one or more authentication vectors. As the S-CSCF 42 is not currently handling UE B because it is assumed that the user had not switched on the terminal (thus, it was not previously registered) an unauthorised status is returned via the S-CSCF and P-CSCF to the user equipment UE B. The unauthorised status contains a challenge request according to the retrieved authentication vector. This prompts the user equipment UE B to implement a re-registration process that includes a challenge response. Thus, the user equipment UE B dispatches a SIP REGISTER request which is received at the I-CSCF via the P-CSCF. This causes the I-CSCF to dispatch a subsequent diameter user authorisation request (UAR) message to the HSS/HLR which returns a diameter user authorisation authentication (UAA) message. Then the I-CSCF seeks to reregister with the S-CSCF. This time the S-CSCF computes the challenge response included in the REGISTER request and dispatches a diameter server assignment request (SAR) message (FIG. 5) which includes a new AVP 60: inform-GPRS-network which requests the HLR/HSS to identify the current CS network to which the user is attached (which is also equal to the network within which the current SGSN is located). The HSS/HRL provides this information in a new AVP 62: GPRS-network-information in a Diameter Server-Assignment-Authorisation (SAA) message (FIG. 6) which is returned to the S-CSCF. At this point, the S-CSCF returns an authorised (OK) status and, once registration is complete, knows the CS network to which the user is attached. The S-CSCF has a store 22 for holding this information, for possible future usage, together with the rest of the user's registration data. Note that FIG. 3 does not illustrate the CS call establishment and backwards INVITE request because these steps are known to a person skilled in the art.

Reference will now be made to FIG. 4 which is a flow chart illustrating the steps involved in processing the INVITE request which is dispatched from the user equipment UE B when it wishes to establish an SIP session towards UE A.

As is known in the art, a particular S-CSCF is identified by a SIP URI (Session Initiation Protocol Uniform Resource Identifier). A SIP URI takes the following general form:

sip:user@host:port;uri parameters?headers.

The "user" field is the identifier of a particular resource at the host being addressed. In this form, the user information comprises the user field, the password field and the @ field. The "host" field identifies the host providing the SIP resource. The "port" field is the port number where the request is to be sent. The URI parameters affect a request constructed from the URI, for example allowing transport, maddr (service address), ttl (time to live), user, method and lr (routing parameters to be set in a manner known per se. "Headers" are header fields to be included in a request constructed from the URI.

This general form is applied in a specific manner in the described embodiment of the invention, as follows.

For the purpose of this application, where user A makes a circuit-switched call to user B, and user B establishes a SIP session towards A, the INVITE request has a Request-URI which is constructed like a SIP URI with the following rules:

the user name part is A's number received from the CS call (in this case the number of UE A in local format), the home domain name is set to the home network domain name (in this case B's home network), the standard parameter ";user=phone" is appended.

For example, if the calling party's number (A's number) is 050 555 6666, and B's home network domain name is "example.com", the user equipment UE B creates the following SIP URI:

sip:0505556666@example.com;user=phone

FIG. 5 illustrates the new Request-URI.

As an alternative, the user equipment UE B could construct a TEL URI (for example as described in RFC 2806) that indicates a phone context in the phone context parameter with the domain name of the home network. For example, for the same information as the earlier case, the TEL URI would be tel:0505556666;phone-context=example.com. The INVITE request is dispatched from the user equipment UE B in accordance with normal IMS procedures. The S-CSCF serving user B (in B's home network) receives the INVITE request (step S1 in FIG. 4). The S-CSCF analyses the Request-URI in the INVITE request and determines that a translation is needed to find out the SIP URI which is mapped to A's telephone number. In order to do this, the S-CSCF determines the network and country of location of UE B (step S2 in FIG. 4). It derives this from the stored data which was available in the registration process in the new AVP 62 GPRS-network-information which is stored at the S-CSCF.

At step S3, the S-CSCF implements a numbering plan table for at least the most frequently accessed network and countries for which the home network has roaming agreements (see FIG. 2). Depending on the criteria, only a few entries could be held, or entries for all possible networks/countries could be held. This table indicates, for each of the roaming networks, the rules that need to be applied to a local number to represent it in international E.164 format, which is the format which is required for an existing ENUM translation mechanism. For instance, if a Finnish 3GTelCo is the visited network, the numbering plan table for 3GTelCo contains rules indicating that the international number is built by removing the first 0 from the local number and prepending the result by a +358. So the local number 050 555 6666 when the user is roaming to 3GTelCo is represented in international E.164 format as +358 50 555 6666. Network operators can configure numbering plans in their S-CSCFs. Another possibility is to have them stored in the HSS, and retrieved from the S-CSCF at registration time. They are updated when a national numbering plan changes.

At step S4, the S-CSCF uses the numbering plan table for the network/country where the user is roaming, and obtains the scripts to transform the local number in the visited network to the international E.164 format (see step S4 in FIG. 4). Then, the S-CSCF issues a normal DNS ENUM query (step S5) to the Domain Name Server (DNS) in B's home network, which in turns contacts or redirects to the DNS server 3 at A's home network or home country, which actually issues the response and obtains the mapped SIP URI to A's telephone number as a result.

At step S6, the S-CSCF routes the SIP request towards the SIP URI obtained in the previous step in accordance with normal SIP/IMS routing procedures to process the INVITE request.

It will be appreciated that the steps illustrated in the process of FIG. 4 can be implemented by any suitable processing means located at the S-CSCF, in particular any suitable combination of software, hardware or firmware.

As a variant of the first embodiment, the user equipment UE B can determine the name of the CS roaming network from the CS attach information. The UE then constructs an INVITE whose request URI is a TEL URI where the phone context is set to the name of the CS roaming network. For example, if the user equipment is roaming to the Finnish network 3GTelCo, the UE creates the following TEL URI:

tel. 050 555 6666;phone-context=FI 3GTelco.

When the invite request is eventually received at the S-CSCF, the S-CSCF can, based on the phone context contents and the local numbering plan of that country, apply the translation of the local number in 3GtelCo's network to an international E.164 number and then proceed in accordance with steps S3 to S6. That is, it need not implement step S2.

Figure 8:
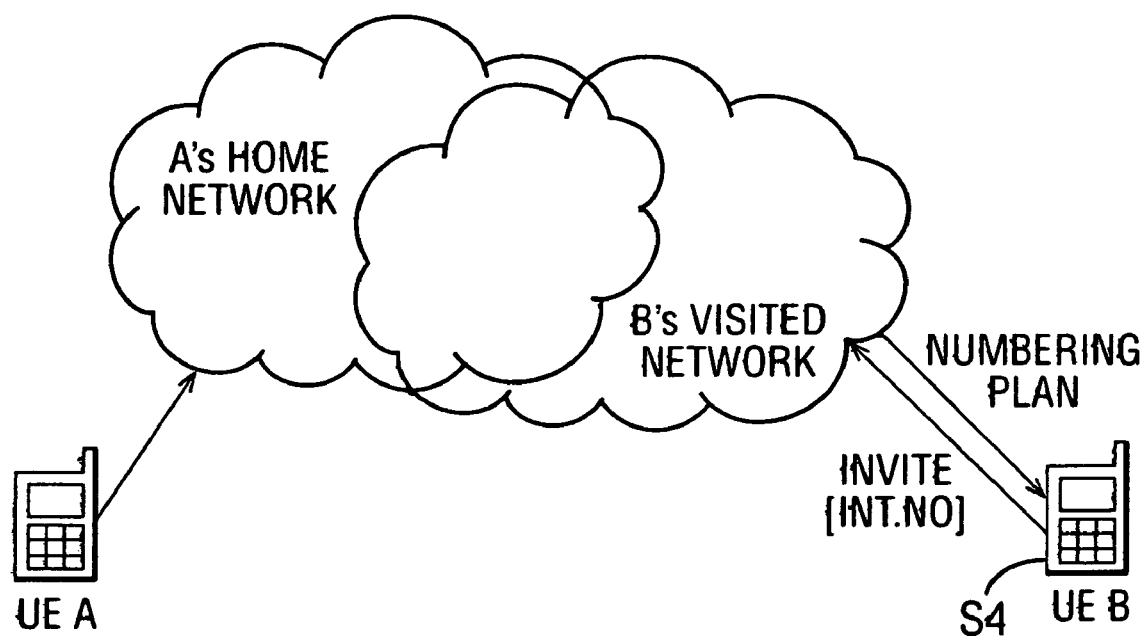
FIG. 8 illustrates schematically a second embodiment of the invention.
Figure 9:
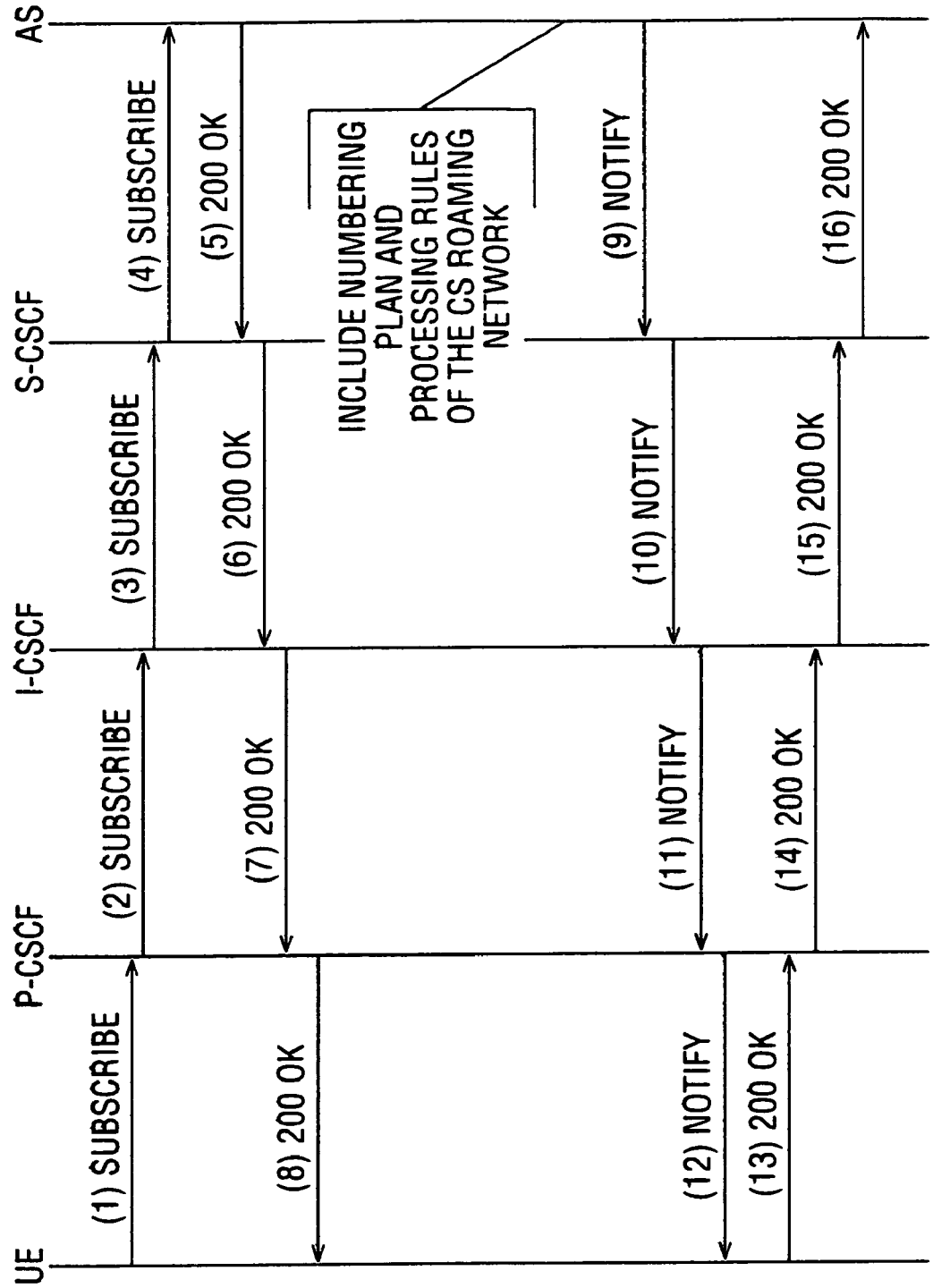
FIG. 9 shows the message exchange for implementing the second embodiment of the invention.

A second embodiment of the invention will now be described with reference to FIG. 8. In this embodiment, the user equipment UE B, upon registration to the IP multimedia system, downloads the numbering plan from the AS/S-CSCF where it is held at the network where it is roaming, and holds it in its store 54. Then, when the user equipment UE B wants to create an SIP INVITE request to establish an SIP session where it only has a local number, the user equipment applies the transformation rules that it has stored in it, so that the INVITE request contains an international E.164 number as the destination (request-URI). That is, there is no need for any translation to be implemented on the network side. The S-CSCF at B's home network receives the INVITE request that contains the international E.164 number and applies normal IMS procedures (that is, implementing a DNS ENUM query to find out the mapped SIP URI (and routes the INVITE request to the located destination in line with normal procedures). This embodiment will now be described in more detail with reference to FIG. 9. The user equipment UE B creates a SUBSCRIBE request addressed to the home network, that is the request-URI is set to the home network name (e.g. sip: example.com). The SUBSCRIBE request contains an Event header field set to the SIP-event package that the user equipment UE B wants to obtain, in this case "numbering plan". The event header field also contains a parameter that identifies the CS network to which the user equipment is roaming. The subscriber request contains an expired header field set to 0 to indicate this is a one stop fetch operation, rather than a long term subscription. An example of the subscribe request is given below:

SUBSCRIBE sip:example.com SIP/2.0
From: <sip:user@example.com>
To: <sip:example.com>
Event: numbering-plan;network=FI3 GTelCo
Expires: 0

The S-CSCF receives the SUBSCRIBE request and based on existing filter criteria and the contents of the event header value, routes the SUBSCRIBE request to the numbering plan application server AS 50. In this embodiment of the invention, it is assumed that the application server AS 50 contains all the numbering plans and processing rules of all networks for which the home network has roaming agreements. It will be appreciated however that a significant advantage will be obtained even if the AS 50 holds numbering plans for only some, e.g. the most common, countries. The numbering plan application server reads the event header field and creates a notify request that contains the numbering plan and processing instructions for the requested network. The UE obtains the notify request and stores the information. Later, when the UE wants to send an INVITE request to a local number, it applies the transformation rules for the specific country where it is roaming and creates an INVITE request that contains an international E.164 number which can be used in TEL or SIP URI as the Request-URI in the INVITE request. This INVITE request is dispatched according to normal procedures to the S-CSCF which itself applies normal IMS procedures to map the telephone number to SIP URI (using a DNS ENUM query), and then routes the message to that destination.

A person skilled in the art can easily determine a few optimizations of the above procedure. For instance, the "numbering plan" event package can be combined with other event packages stored at the home network (such as the user policy, or the home network policy). This allows a more compact representation of the information, and a single subscription to various pieces of information.

The above described embodiments of the present invention provide the common advantage that it is always possible to provide an international E.164 number format which can then be used in a DNS ENUM query to translate into an SIP URI of the called party, regardless of whether the called party is roaming or not.

The first embodiment is particularly advantageous to implement because it does not require support from the user equipment. Instead, all the intelligence is on the network side.

The second embodiment is useful because the intelligence in the terminal can be reused for different purposes. For example, the numbering plan that the user equipment downloads from the network can be extended to include the emergency numbers of the visited country.

The invention claimed is:

1. A method to select a numbering plan comprising:
selecting, at a call state controller, a numbering plan from a plurality of numbering plans, wherein the numbering plan is selected to correspond to a calling party and at least one of a country of the calling party and a network of the calling party, wherein the calling party is in a home network which is a visited network where a called party is roaming; and
converting a telephone number of the calling party in a format comprising a national format of said telephone number according to the at least one of the country or the network to another format comprising an international telephone number format of said telephone number using the numbering plan, the converted international telephone number of the calling party provided to an E.164 number translator to determine a session initiation protocol uniform resource identifier to enable a call back from the called party to the calling party, wherein said selecting and said converting are performed on least at one of a user equipment of the called party and a call state control function.

2. The method according to claim 1, further comprising:
supplying the telephone number, wherein the supplying comprises a circuit switched call from the calling party to the called party.

3. The method according to claim 1, wherein the selecting the numbering plan further comprises issuing an invite request from the called party to a serving controller which holds the plurality of numbering plans.

4. The method according to claim 1, wherein the selecting the numbering plan based on the network comprises accessing a database to determine said at least one of the network and the country where the called party is located.

5. The method according to claim 4, wherein the database comprises a home subscriber server located in a home network of the called party.

6. The method according to claim 3, further comprising:
including, in the invite request, the telephone number in the format and an indicator identifying said at least one of the network and the country where the called party is located.

7. The method according to claim 6, wherein the indicator comprises telephone numbers.

8. The method according to claim 1, wherein the selecting the numbering plan comprises issuing a request for the numbering plan to a server, wherein the server selects the numbering plan based on at least one of a network identifier and a country identifier submitted within the request.

9. The method according to claim 8, further comprising:
downloading the numbering plan from the server to a user equipment of the called party.

10. The method according to claim 1, wherein the numbering plan comprises rules governing how a national number is to be converted into an international format.

11. The method to select a numbering plan according to claim 1, comprising:
issuing a translation request using the telephone number in the other format; and
translating the telephone number in the other format into a user identifier for routing a session request from the other called party to the calling party for call back services.

12. The method according to claim 11, wherein the translating the telephone number comprises using an E.164 number translation service.

13. A method to select a numbering plan comprising:
receiving, from a called party located in a visited network and roaming in a home network of a calling party, a request including a telephone number of the calling party in a format comprising a national format of said telephone number according to a country or a network of the calling party where the called party is located;
determining at least one of a country and a network of the calling party where the called party is located; and
selecting a numbering plan based on the at least one of the country and the network and using the numbering plan to convert the telephone number of the calling party from the format to another format comprising an international telephone number format of said telephone number, the converted international telephone number of the calling party provided to an E.164 number translator to determine a session initiation protocol uniform resource identifier to enable a call back from the called party to the calling party, wherein said selecting is performed on least at one of a user equipment of the called party and a call state control function, wherein the user equipment roams to the visited network.

14. The method according to claim 13, wherein the determining the at least one of the country and the network comprises accessing a home subscriber server of the called party.

15. The method according to claim 13, wherein the determining the at least one of the country and the network comprises using a network/country identifier in the request from the called party.

16. The method according to claim 13, wherein the determining the at least one of the country and the network comprises determining the at least one of the country and the network based on information received during a registration procedure of the called party.

17. The method according to claim 13, comprising:
issuing a translation request using the telephone number in the other format; and
translating the telephone number in the other format into a user identifier for routing a session request from the called party to the calling party for call back services.

18. A system to select a numbering plan comprising:
a first network including a serving controller, the serving controller configured to hold at least one numbering plan to convert a telephone number from a format to another format;
an establishing unit configured to establish a call between a calling party and a called party in a visited network, the called party is supplied with the telephone number of the calling party in the format comprising a national format of said telephone number according to a country or a network of the calling party where the called party is located;
a determining unit configured to determine at least one of the country and the network of the calling party where the called party is located;
a selector configured to select, in a home network of the called party, a numbering plan from said at least one numbering plan, based on the at least one of the country and the network; and
a converter configured to convert the telephone number from the format to the other format comprising an international format of said telephone number using the numbering plan, wherein said selector and converter are located on least at one of a user equipment of the called party and a call state control function, wherein the user equipment roams to the visited network.

19. The system according to claim 18, comprising:
an issuing unit configured to issue a translation request using the telephone number in the other format; and
a translator configured to translate the telephone number in the other format into a user identifier for routing a session request from the called party to the calling party for call back services.

20. The system according to claim 19, further comprising:
a forwarding unit configured to forward the session request wherein the session request includes the user identifier for routing the session request to the calling party.

21. The system according to claim 19, wherein the translator is further configured to comprises an E.164 number translation server.

22. An apparatus to select a numbering plan comprising:
a receiver configured to receive, from a called party in a visited network, a request with a telephone number of a calling party in a format comprising a national format of said telephone number according to a country or a network of the calling party where the called party is located;
a determining unit configured to determine at least one of the country and the network of the calling party where the called party is located;
a selector configured to select, in a home network of the called party, a numbering plan based on the at least one of the country and the network; and
a converter configured to convert the telephone number of the calling party from the format to another format comprising an international format of said telephone number, wherein said selector and converter are located on least at one of a user equipment of the called party and a call state control function, wherein the user equipment roams to the visited network.

23. The apparatus according to claim 22, comprising:
another receiver configured to receive information on the at least one of the country and the network where the called party is located, and wherein the determining unit is further configured to use the information in determining the at least one of the country and the network.

24. The apparatus according to claim 23, wherein another receiver is further configured to receive the information during a registration procedure of the called party or within receiving said request with the telephone number of the first party in the format.

25. The apparatus according to claim 22, comprising:
an issuing unit configured to issue a translation request including the telephone number in the other format.

26. The apparatus according to claim 22, comprising a serving controller.

27. The apparatus according to claim 22, comprising a serving call session control function.

28. The apparatus according to claim 22, wherein the network entity is configured to hold numbering plans for each of a plurality of networks or countries.

29. The apparatus according to claim 28, wherein the numbering plan is further configured to hold numbering arrangements for each of a number of countries.

30. An apparatus to select a numbering plan comprising:
a downloading unit configured to download a numbering plan from a server to convert a telephone number from a format comprising a national format of said telephone number according to a country or a network of a calling party where a called party is located to another format;
a receiver configured to receive the telephone number of the calling party in the format; and
a converter configured to convert the telephone number from the format to the other format comprising an international format of said telephone number, wherein said converter is located on least at one of a user equipment of the called party and a call state control function, wherein the user equipment roams to a visited network.

31. The apparatus according to claim 30, further comprising:
establishing unit configured to establish a session towards the calling party using the telephone number in the other format.

32. The apparatus according to claim 30, wherein the downloading unit further comprises a submitting unit configured to submit, to the server, an identifier indicating at least one of a network and a country where the called party is located.

33. The apparatus according to claim 32, further comprising a memory configured to hold the numbering plan.

34. The apparatus according to claim 32, further comprising a mobile terminal comprising an antenna configured to wirelessly receive and transmit signals in a mobile communications system.

35. The apparatus of claim 30 further comprising:
a register unit configured to register subscribers to a packet switched communication system;
a receiver configured to receive a registration procedure message, the registration procedure message including a request to identify a circuit switched network to which a user to be registered is currently attached;
a retriever configured to retrieve, from a registration functionality of the circuit switched network, the circuit switched network to which the user is attached; and
an identifier configured to identify the circuit switched network in the registration procedure response message.

36. A non-transitory computer program embodied on a computer readable medium, the computer program being configure to control a processor to perform at least the following:
selecting, at a call state controller, a numbering plan from a plurality of numbering plans, wherein the numbering plan is selected to correspond to a calling party and at least one of a country of the calling party and a network of the calling party, wherein the calling party is in a home network which is a visited network where a called party is roaming; and
converting a telephone number of the calling party in a format comprising a national format of said telephone number according to the at least one of the country or the network to another format comprising an international telephone number format of said telephone number using the numbering plan, the converted international telephone number of the calling party provided to an E.164 number translator to determine a session initiation protocol uniform resource identifier to enable a call back from the called party to the calling party, wherein said selecting and said converting are performed on least at one of a user equipment of the called party and a call state control function.

37. An apparatus to select a numbering plan, comprising:
a selecting unit configured to select a numbering plan from a plurality of numberings plans based on at least one of a country and a network of a calling party where a called party is located, the called party being in a visited network which is the home network of the calling party; and a converting unit configured to convert a telephone number of the calling party in a format comprising a national format of said telephone number according to the country or the network where the called party is located to another format comprising an international format of said telephone number using the numbering plan, wherein said selecting unit and said converting unit are included in one of a user equipment of the called party and a call state control function, wherein the user equipment roams to the visited network.

* * * * *